Oct. 27, 1953       R. E. BOYDEN       2,656,975
DIFFERENTIAL ACTUATOR MOTION TRANSMISSION MEANS
Original Filed March 13, 1945                3 Sheets-Sheet 1

INVENTOR.
ROBERT E. BOYDEN
BY
ATTORNEY

Oct. 27, 1953     R. E. BOYDEN     2,656,975
DIFFERENTIAL ACTUATOR MOTION TRANSMISSION MEANS
Original Filed March 13, 1945     3 Sheets-Sheet 3

INVENTOR.
ROBERT E. BOYDEN
BY
ATTORNEY

Patented Oct. 27, 1953

2,656,975

UNITED STATES PATENT OFFICE 2,656,975

DIFFERENTIAL ACTUATOR MOTION
TRANSMISSION MEANS

Robert E. Boyden, Los Angeles, Calif., assignor to Clary Multiplier Corporation, San Gabriel, Calif., a corporation of California Original application March 13, 1945, Serial No. 582,553. Divided and this application September 17, 1949, Serial No. 116,253

3 Claims. (Cl. 235—60.27)

This invention relates to calculating and the like machines and has particular reference to means for transmitting motion from one series of gear elements to another wherein the spacings of the elements in one series differs from those in the other.

In multi-denominational computing machines having a series of orders of geared computing units placed side by side, it is often desirable and necessary to arrange certain elements of the units at one spacing and other elements of the units at another spacing. For example, in rack driven machines of the above type it may be desirable to locate the racks at a relatively wide spacing to accommodate amount keys in proper relation thereto while grouping the printer elements associated with the racks at relatively narrow spacings to condense the printed values.

Heretofore, various types of condensing arrangements have been used for the above purpose. In one form, offset racks, bellcranks or the like have been provided in which portions of such elements have been offset laterally relative to other portions so as to form transmitting elements for transmitting motion from one vertical plane to another. Although such motion transmitting mechanisms have worked satisfactorily in general, they tend to set up binding forces in their bearings due to this offset relationship. Another form of condensing arrangement takes the form of a plurality of hollow shafts nested within each and independently rotatable relative to each other. Such a transmission mechanism is relatively expensive to manufacture and considerable care must be taken to insure free rotation between all of the nested shafts. Gear type condensing mechanisms have also been used in the past but all such arrangements of which I am aware have been very complicated and bulky.

Accordingly, the principal object of the present invention is to provide an improved mechanism for transmitting motion between a set of reciprocal racks and a set of gears, the spacings between the gears being different than the spacings between the racks.

Another object is to provide an improved type of condensing, motion transmission mechanism between the racks and printer unit of a calculating machine which is of simple and compact construction.

The manner in which the above and other objects of the invention are accomplished will be readily understood on reference to the following specification when read in conjunction with the accompanying drawings, wherein.

Figure 1:
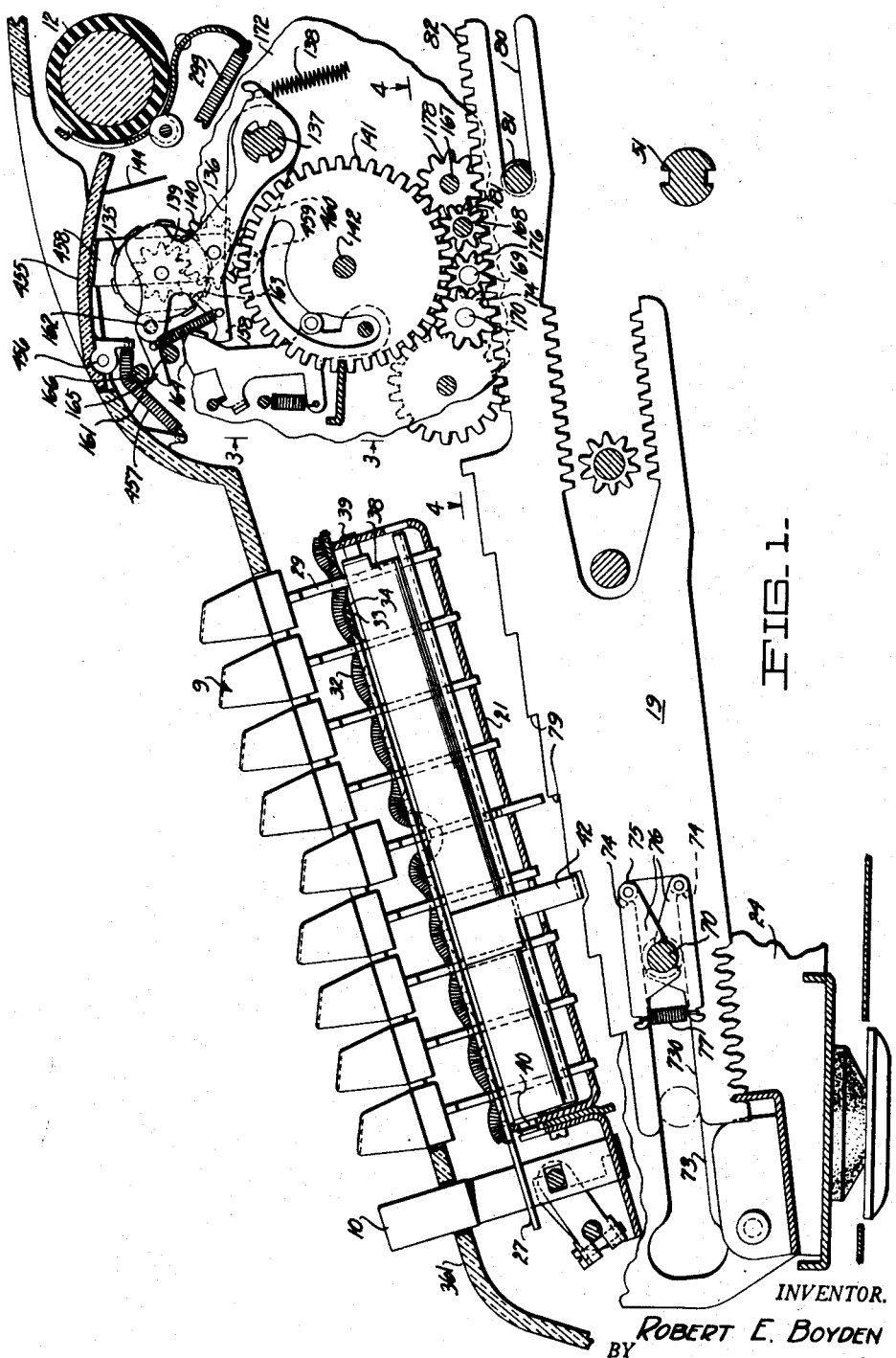
Fig. 1 is a longitudinal sectional view, with parts broken away, of a machine embodying a preferred form of the invention.

The present application is a division of the co-pending R. E. Boyden application, Serial No. 582,553, filed March 13, 1945, and entitled "Calculating Machine," now Patent No. 2,583,810.

The invention is disclosed in connection with a motor operated, key controlled adding machine of the type disclosed and claimed in the co-pending Boyden application, Serial No. 582,553, filed March 13, 1945, now Patent No. 2,583,810 and reference is hereby made thereto for an understanding of details of the machine not specifically disclosed herein. Accordingly, various control and operating mechanisms of the machine are omitted in this application for the sake of brevity and clarity since they are not deemed necessary for an understanding of the present invention. However, it should be noted that the operating mechanism includes a cyclic shaft 51 (Fig. 1) which, upon depression of a control bar, one of which is illustrated at 10, is given a single complete rotation to effect a cycle of operation of the machine.

The keyboard comprises a series of rows of amount keys 9, the keystems 29 of which are slidable in aligned slots formed in a top plate 27 and a keyframe 21. The keys in each bank are yieldably pressed upward by a tension spring 32 passing through the keystems thereof and extending along the length of the keyboard and suitably attached at opposite ends to the plate 27.

Means are provided for locking the depressed key in its lowered position and for releasing any such depressed key. Each keystem has a cam lobe (not shown) formed thereon which, when the key is depressed, rocks a locking bail 38 about trunnion bearings 39 and 40 at opposite ends thereof. At the end of its stroke, the cam lobe passes below the locking bail, enabling the latter to retract partially under the action of a spring (not shown) to a position where it latches the key depressed.

A zero stop 42 is attached to each locking bail 38 and, when no key in any one order is depressed, the bail 38 in that order will be held in an extremely inwardly rocked position in which the zero stop 42 lies directly in front of one of a series of shoulders 79 formed on an associated drive rack 19, thereby preventing any substantial forward movement of the rack and its subsequent phases of the machine cycle. However, when an amount key in that order is depressed and latched down, the locking bail will be held outwardly sufficiently to maintain the associated zero stop 42 out of the path of the aligned rack, while the keystem of the depressed key will be located in front of an associated shoulder 79. The shoulders 79 are so spaced that the rack will subsequently be allowed to move forward a number of increments equal to the value of the depressed key before being arrested thereby. Each of the drive racks 19 is provided with elongated slots 80 and 730 guided over shaft 81 and 70, respectively, forming supporting and guiding means for the racks.

Each of the slots 730 terminates in opposed lateral depressions 74 at its closed end. Each of these depressions is normally engaged by a roller 75 carried by a drive element 76 which is rockably fitted within a groove in the shaft 70. The two drive elements 76 associated with any one rack 19 are spring urged in opposite directions about the shaft by a tension spring 77 connected between the elements to thus form a yieldable drive connection between the shaft and the respective drive racks.

During a cycle of operation of the machine, the shaft 70 is moved forwardly along slots 73 formed in the machine frames, one of which is shown at 24, and in doing so, the various drive elements 76 carry therewith the racks 19 until they are stopped by the keystems of any depressed keys. In case no key in an order is depressed, the drive elements in that order will be ineffective to drive the associated rack and thus the rollers 75 will ride out of the depressions 74 immediately against the action of spring 77, thereby breaking the connection between the shaft and the rack. The aforementioned yieldable drive mechanism is disclosed and claimed in the co-pending R. E. Boyden application, Serial No. 718,706, filed December 27, 1946.

The various racks 19 are entrained through a condensing arrangement (to be described hereinafter) with a printer device arranged to print on a strip of paper (not shown), passing over a platen 12, values corresponding to the values of depressed ones of the keys 9.

The printer comprises a series of printing dials or elements 135 equal in number to the number of drive racks 19. Each numeral dial has thereon a series of equi-spaced type characters arranged progressively in value from 0 to 9.

Each printer element 135 is rotatably mounted on a separate arm 136 loosely keyed on a printer control shaft 137 and spring urged clockwise by a tension spring 138 extending between the arm and a suitable portion (not shown) of the machine frame. Also, each element 135 has integrally secured thereto a gear 139 permanently meshed with a gear 140, also rotatably mounted on the associated arm 136. When an arm 136 is held in its normal position illustrated in Fig. 1 by the shaft 137, the gear 140 is meshed with an aligned one of a series of idler gears 141, all rotatably mounted on a stationary cross-shaft 142.

At approximately the mid-point in a machine cycle, and after the racks have digitized the accumulator and printer, the printer control shaft 137 is rocked clockwise, permitting the springs 138 to rock the printer arms 136 and thus carry the printer dials 135 forward into contact with a printing ribbon 144 and the paper strip whereby the value registered on the dials will be printed on the paper at the printing point.

Means are provided for retaining each printing dial 135 in its angularly registered position after the associated gear 140 entrained therewith is demeshed from its associated idler 141 upon clockwise rocking movement of the associated arm 136 during the printing phase. For this purpose, a detenting pawl 161 is pivoted at 162 on the associated arm 136 and has a detenting tip 163 adapted to engage between two adjacent teeth of the gear 139. A tension spring 164 extends between the pawl and the lever to continuously urged the pawl toward engagement with the gear. However, when the printing arms are located in their normal positions illustrated in Fig. 1, a tail on each of the pawls engages a stationary cross-shaft 165, thus holding the pawls out of engagement with the gears 139 so as to reduce any drag on the entrained gearing and drive racks in their forward digitizing movement.

A second stationary rod 166 extends above the tails of the pawls 161 when the parts are in their normal positions shown in Fig. 1. During relatively high speed operations, when the arms 136 are rocked clockwise during the printing phase, the tails 161a strike the cross-rod 166 and are thus positively forced counter-clockwise into detenting engagement with the gears 139.

Figure 2:
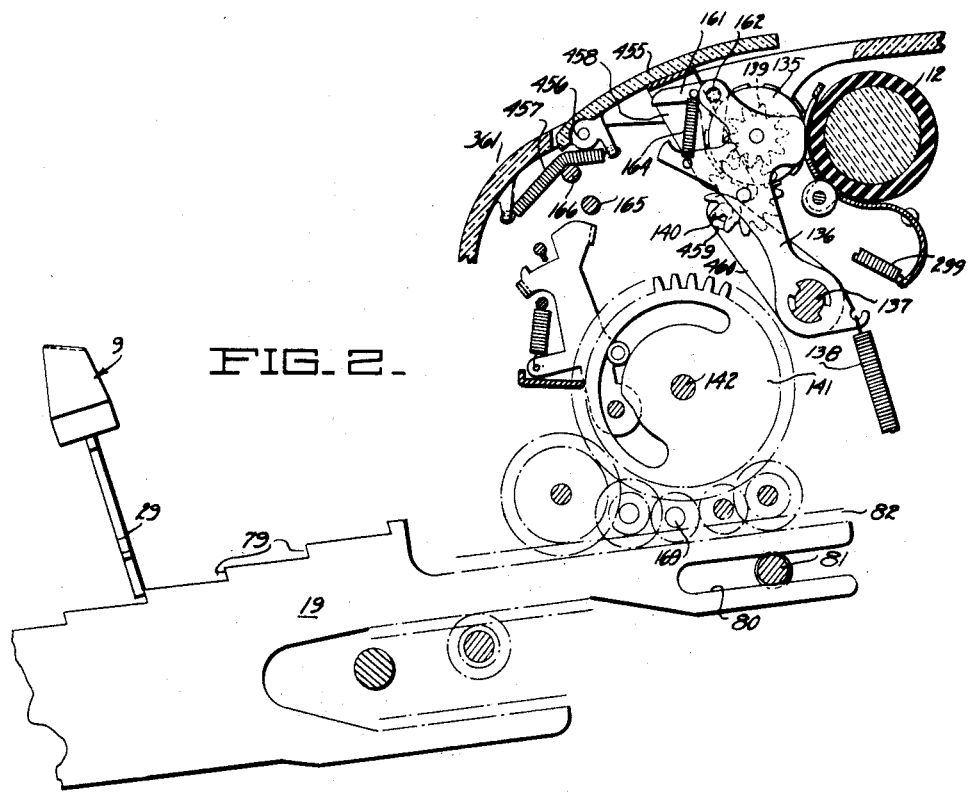
Fig. 2 is a sectional view, similar to that of Fig. 1, but illustrating the printing mechanism in a stage partially through its operation.
Figure 3:
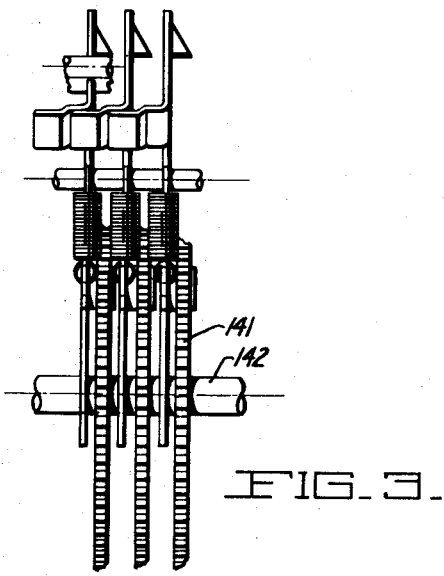
Fig. 3 is an enlarged front view of part of the printer control mechanism and is taken substantially along the lines 3—3 of Fig. 1.
Figure 4:
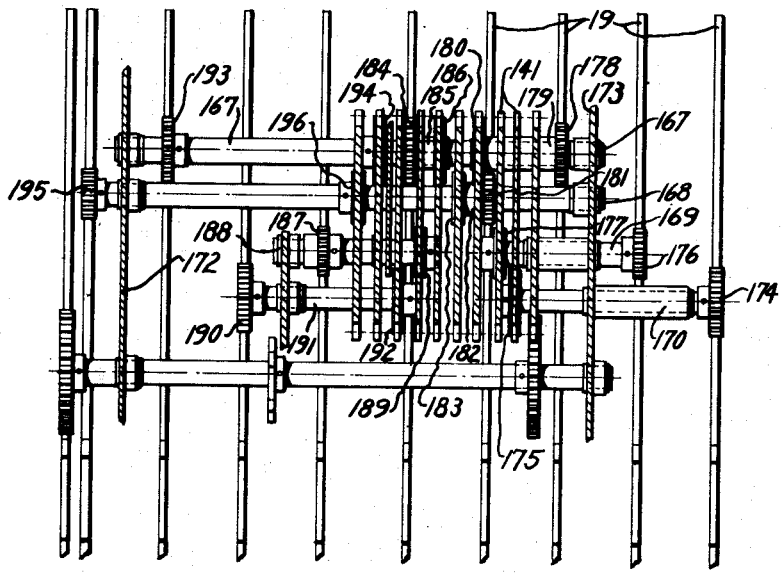
Fig. 4 is a sectional plan view of the condensing arrangement for transmitting a drive from the drive racks to the printer mechanism, and is taken substantially along the lines 4—4 of Fig. 1.

The printer dials 135 and their entrained gear 140 and 141 are spaced relatively close together, as indicated in Fig. 4, whereas the racks 19 are spaced apart relatively greater distances. Therefore, according to the present invention, means are provided for connecting the various idler gears 141 with their associated drive racks 19 in order to register the printing dials in accordance with the numerical positions to which their associated drive racks 19 are moved. For this purpose, a series of shafts 167 to 170, inclusive (Figs. 1, 2 and 3), are journalled in bearings provided in stationary frame plates 172 and 173 and carry various pinion assemblies or gear units which are arranged to entrain the idlers 141 with their respective racks 19. These pinion assemblies each comprise gears of like diameters and the gears of the different assemblies progressively increase in diameter outwardly from the nearest adjacent teeth of the idlers 141 and racks 19. For example, the rack gear section 82 (Fig. 1) of the rack in the #1 or right hand order (as seen in Fig. 4) of the machine is meshed with a pinion 174 fixed on the shaft 170 to which is also fixed a pinion 175 meshing with the #1 idler 141 entrained with the "cents" column numeral printing dial 135. In Fig. 4, this idler is located next to the right hand idler 141, the latter being reserved to print a symbol character in a manner not shown. Similarly, the rack in the second order from the right is connected by a pinion 176, shaft 169 and pinion 177 to the #2 idler. The rack in the third order is connected by pinion 178, sleeve 179 (rotatably mounted on shaft 167) and pinion 180 to the #3 idler 141. The rack in the fourth order is connected by a pinion 181, sleeve 182 (rotatably mounted on shaft 168) and idler 183 to the #4 idler. The rack in the fifth order is connected by pinion 184, sleeve 185 and pinion 186 to the #5 idler. The rack in the sixth order is connected by pinion 187, shaft 188 (coaxial with but independent of shaft 169) and pinion 189 to the #6 idler. The rack in the seventh order is connected by pinion 190 from the shaft 191 (coaxial with but independent of shaft 170) and pinion 192 to the #7 idler. The rack in the eighth order is connected by pinion 193, shaft 167 and pinion 194 to the #8 idler. The rack in the ninth order is connected by pinion 195, shaft 168 and pinion 196 to the #9 idler.

The supporting plates 172 and 173 are removably mounted on the frame plates 24 in a suitable manner (not shown) and support the various elements of the printer including the shafts 142 and 167 to 170, inclusive, independently of the supports for the racks 19 so that the printer may be readily removed as a unit from the machine, the various pinions carried by the shafts 167 to 170 demeshing from the racks 19.

The machine is encased in a cover 361 and an opening is formed in the latter directly adjacent the platen 12. The latter opening is closed by a movable cover section 455 pivoted on trunnion bearings 456. The section 455 is urged downwardly into its normal position shown in Fig. 1 partly by its own weight and partly by a spring 457 depending between projections on the section and on the cover 361. An arm 458 attached to the section 455 has a cam surface on the lower end thereof which overlies a roller 459 carried by an arm 460 secured to the aforementioned printer control shaft 137.

Having thus described the invention, what I desire to secure by United States Letters Patent is:

1. In a calculating machine, the combination of a plurality of independently reciprocatable rectilinearly movable racks arranged side by side, means supporting said racks for rectilinear movement, a plurality of gears of equal diameters arranged side by side, means supporting said gears for independent rotation about a common axis, said gears being spaced apart distances different than the spacings between said racks, and a plurality of gear units displaced relative to each other around the peripheries of said gears, said gear units having such progressively increasing diameters at progressively increasing distances from a point of minimum distance between a said gear and a respective one of said racks that each gear unit meshes respectively, with one of said racks and with one of said gears, and means supporting said gear units for rotation about axes parallel to and fixed relative to said common axis.

2. In a calculating machine, the combination of a plurality of independently reciprocatable rectilinearly movable racks arranged side by side, a plurality of gears arranged side by side and independently rotatable about a common axis, a plurality of gear units displaced relative to each other around the peripheries of said gears, said gear units having such progressively increasing diameters at progressively increasing distances from a point of minimum distance between a said gear and a respective one of said units that each gear unit meshes, respectively, with one of said racks and with one of said gears, each of said gear units being rotatable about an axis parallel to and fixed relative to said common axis, means for supporting said racks for rectilinear movement, and means for supporting said gears and said gear units together as a unit independently of said rack supporting means whereby said gears and said gear units may be readily removed as a unit from said racks.

3. In a calculating machine, the combination of a plurality of independently reciprocatable rectilinearly movable racks arranged side by side, means supporting said racks for rectilinear movement, a plurality of gears of equal diameters arranged side by side, means supporting said gears for independent rotation about a common axis, said gears being spaced apart distances different than the spacings between said racks, and a plurality of gear units displaced relative to each other around the peripheries of said gears, said gear units each comprising a rotatable shaft and a pair of first and second spaced gears fixed on said shaft, said gears of each of said pairs being of equal diameter, said pairs of gears having such progressively increasing diameters at progressively increasing distances from a point of minimum distance between a said first mentioned gear and a respective one of said racks that said first gears mesh with respective ones of said racks and said second gears mesh with respective ones of said first mentioned gears; and means supporting said shafts for rotation about axes parallel to and fixed relative to said common axis.

ROBERT E. BOYDEN.

References Cited in the file of this patent

UNITED STATES PATENTS

| Number | Name | Date |
|---|---|---|
| 1,051,904 | McCarthy | Feb. 4, 1913 |
| 1,693,279 | Kreider | Nov. 27, 1928 |
| 1,904,626 | Ogden et al. | Apr. 18, 1933 |
| 2,052,485 | Ogden | Aug. 25, 1936 |
| 2,108,884 | Green | Feb. 22, 1938 |
| 2,374,760 | Lindstein | May 1, 1945 |